United States Patent [19]

Vick

[11] Patent Number: 4,978,183

[45] Date of Patent: Dec. 18, 1990

[54] HOLOGRAPHIC OPTIC ELEMENT COLLIMATOR AND METHOD AND APPARATUS FOR MANUFACTURE

[75] Inventor: Gerald L. Vick, Mount Vernon, Iowa

[73] Assignee: Rockwell International Corporation, El Segundo, Calif.

[21] Appl. No.: 366,812

[22] Filed: Jun. 16, 1989

[51] Int. Cl.⁵ .............................................. G03H 1/10
[52] U.S. Cl. .................................. 350/3.67; 350/3.81
[58] Field of Search ...................... 350/3.67, 3.7, 3.72, 350/3.81

[56] References Cited

U.S. PATENT DOCUMENTS 3,602,570 8/1971 Greenaway ........................ 350/3.81
4,421,380 12/1983 McGrew ............................ 350/3.76
4,445,749 5/1984 Berton ............................... 350/3.76

OTHER PUBLICATIONS

P. Hariharan, *Optical Holography Principles, Techniques & Applications,* Cambridge University Press, 1984, pp. 191–193.

McCauley et al., "Holographic Optical Element for Visual Display Applications", *Applied Optics,* Feb. 1973.

*Primary Examiner*—Bruce Y. Arnold
*Assistant Examiner*—J. P. Ryan
*Attorney, Agent, or Firm*—Gregory G. Williams; M. Lee Murrah; H. Frederick Hamann

[57] ABSTRACT

A holographic optic element collimator and method in apparatus for its manufacturer is disclosed where the holographic optic element collimator consists of a holographic recording medium with an interference pattern recorded thereon from an incident collimated reference beam and an off access coherent object beam which has a variable angle of incidence with respect to the holographic recording medium.

6 Claims, 1 Drawing Sheet

HOLOGRAPHIC OPTIC ELEMENT COLLIMATOR AND METHOD AND APPARATUS FOR MANUFACTURE

CROSS REFERENCE

This application relates to the subject matter of a co-pending application by G. L. Vick, entitled, "Wide Viewing Angle Avionics Liquid Crystal Display" filed on the same date herewith, assigned to the same assignee, the Ser. No. of which is 07/367,066; and the subject matter is hereby incorporated herein by this reference.

FIELD OF INVENTION

The present invention generally relates to holograms and, more particularly, relates to holographic optic elements, and even more particularly concerns holographic optic element collimators for providing collimated light from a diffuse light source.

BACKGROUND OF THE INVENTION

In the past, optical scientists have used bulk optics, such as lenses or mirrors in order to produce collimated light from a diffuse light source. While such bulk optics have been widely used in the past, they do have several serious drawbacks. One problem with bulk optics is the size of such optical elements are prohibitive in compact display devices. Similarly, the weight associated with typical bulk optics are also undersirable in aviation applications.

Consequently, there exists a need for improvement in collimators which are used to provide collimated light from a diffuse light source, without the size and weight problems which are typically associated with bulk optics.

SUMMARY OF THE INVENTION

It is an object of the present invention to provide collimated light from a diffuse light source.

It is a feature of the present invention to include a holographic optic element collimator.

It is an advantage of the present invention to reduce the size and weight of collimators.

The present invention provides a holographic optical element and a method and apparatus for its manufacture, which is designed to satisfy the aforementioned needs, produce the above described objects, include the previously discussed features, and achieve the already articulated advantages. The present invention is carried out in a "bulk opticsless" approach, in the sense that bulk lenses and mirrors are not utilized. Instead, a holographic optic element provides for collimation of diffuse light.

Accordingly, the present invention includes a holographic optic element which includes a holographic recording medium with an interference pattern thereon which results from the interference of a planar reference beam and an object beam having annular symmetry about a normal to the holographic recording medium.

BRIEF DESCRIPTION ON THE DRAWINGS

The invention will be best understood by a reading of the description in conjunction with the drawings in which.

DETAILED DESCRIPTION

Figure 1:
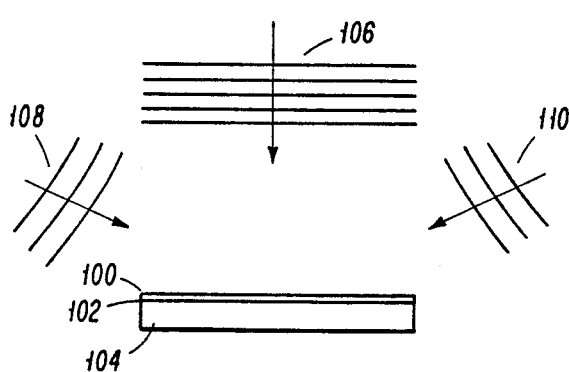
FIG. 1 is a schematic representation of a simplified embodiment of the present invention which shows a plurality of object beams.

Now referring to FIG. 1, there is shown a schematic representation of an embodiment of the present invention, which basically shows the set up required for the production of a holographic optic element collimator. A planar holographic recording medium 100 is shown disposed across a planar surface 102 of a glass plate 104. Holographic recording medium 100 can be chosen from known holographic recording mediums in the prior art, however, a holographic recording medium which provides a high degree of resolution is preferred.

A reference beam 106 is shown incident upon the holographic recording medium at normal incidence. Reference beam 106 is preferably a collimated plane wave. Also shown are object beams 108 and 110 which are preferably beams coherent with each other and with reference beam 106. Object beams 108 and 110 preferably have annular symmetry about the normal to the holographic recording medium.

In operation, the reference beam 106 and object beams 108 and 110 are caused to interfere and an interference pattern resulting from such interference is recorded in the holographic recording medium 100.

Figure 2:
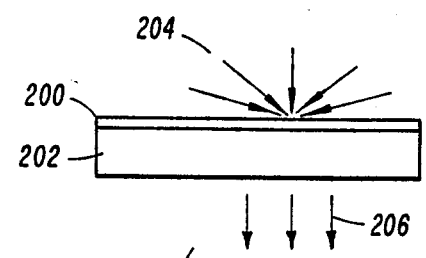
FIG. 2 is a schematic representation of a typical use of a holographic optic element collimator of the present invention.

Now referring to FIG. 2, there is shown a schematic representation of a typical use of the holographic optic element collimator of the present invention. A holographic optic element collimator 200 is shown disposed upon a substrate 202. Diffuse light rays 204 are shown to be incident upon holographic optic element collimator 200 while more collimated light rays 206 are shown as being transmitted through the substrate 202. Consequently, the holographic optic element collimator, in effect, recreates the reference beam 106 (FIG. 1) by an input of diffuse light rays 204, which are similar to object beams 108 and 110 (FIG. 1). A compact, light weight collimator is then perfected upon substrate 202.

Figure 3:
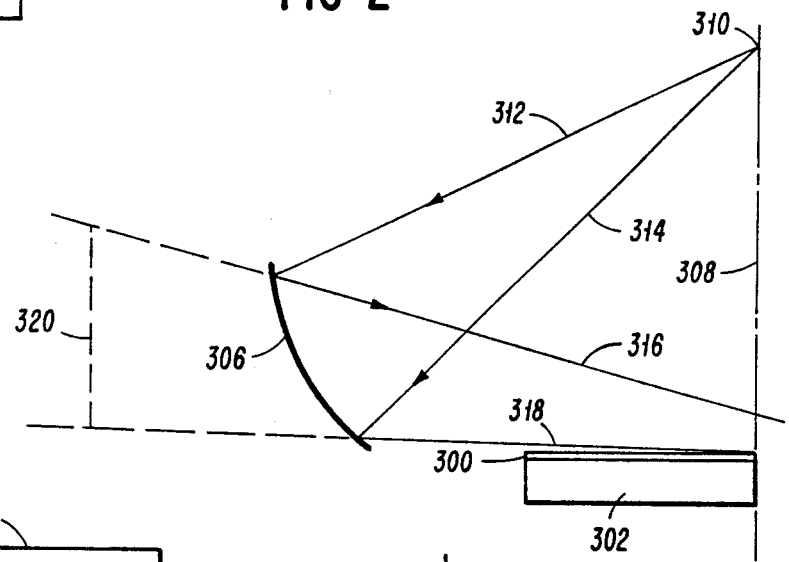
FIG. 3 is a schematic representation of a preferred embodiment of the present invention, which includes an apparatus for producing a holographic optic element collimator, which includes a rotating curved reflector.

Now referring to FIG. 3, there is shown a schematic representation of a preferred embodiment of the present invention which shows a holographic recording medium 300 disposed upon a substrate 302. A rotating curved reflecting surface 306 is showing disposed about a normal center line 308 which is normal to the surface of holographic recording medium 300. Rotating curved reflecting surface 306 is caused to rotate around central normal line 308 so as to create an annular symmetry about the central normal line 308. A point source, 310, of light is positioned above the holographic recording medium 300 along center normal line 308. Light rays 312 and 314 reflect off rotating curve reflecting surface 306 to create reflected light rays 316 and 318, respectively. The rotation and reflection of said light rays 312 and 314 create a virtual image of a line 320 having annular symmetry around the central normal line 308.

This configuration is one preferred embodiment of the present invention which is used to create the object beams 106 and 110 (FIG. 1) having annular symmetry around the holographic recording medium 100 (FIG. 1).

Figure 4:
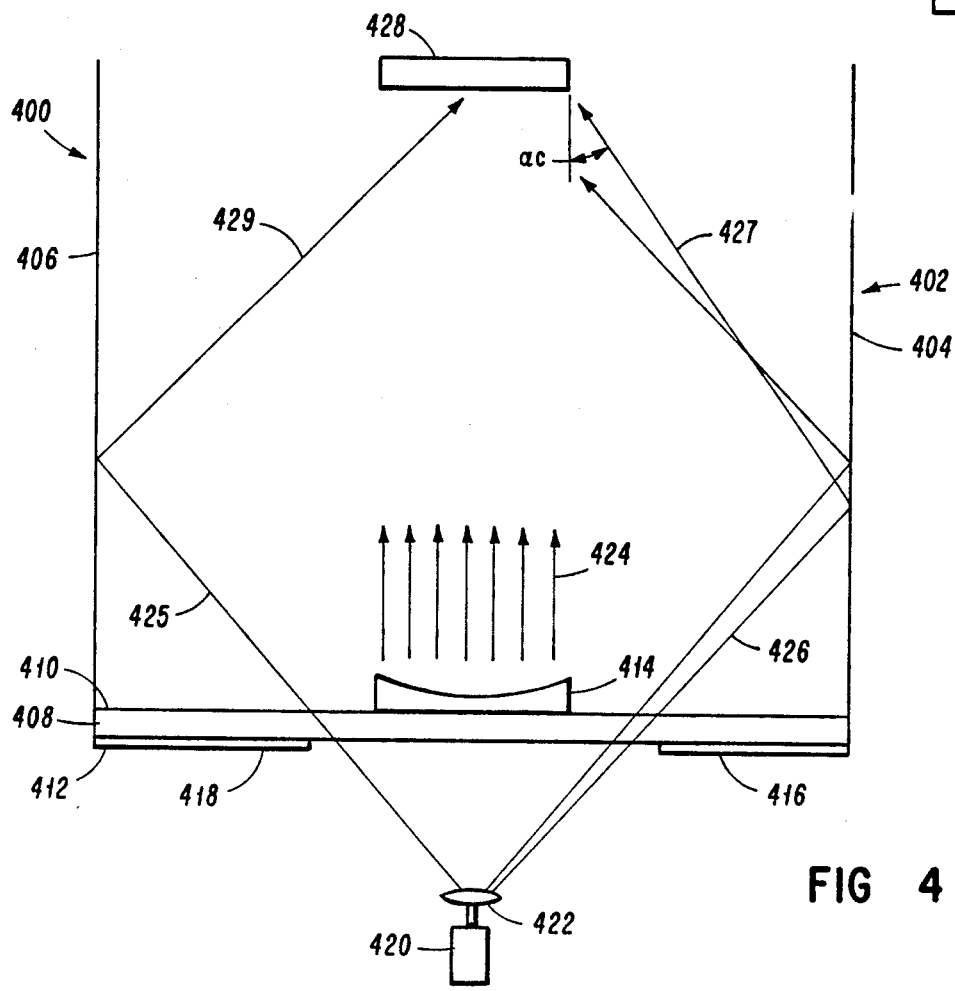
FIG. 4 is a schematic representation of another preferred embodiment of the present invention, which includes an optical chamber for reflecting light toward the holographic recording medium.

Now referring to FIG. 4, there is shown a preferred embodiment of the present invention generally designated 400 which includes a cylindrical optical chamber 402 having parallel reflecting sides 404 and 406, and transparent back surface 408, having a interior surface 410 and an exterior surface 412. Disposed on interior surface 410 of transparent back surface 408 is a negative lens 414. Disposed on exterior surface 412 of back surface 408 is a right optical stop 416 and left optical stop 418, for regulating the angle of incidence of the reflected object beam 427. Laser 420 is shown coupled with a beam expander 422, which in combination, produces a divergent coherent light source. Light from said divergent coherent light source passes either through the negative lens 414 and produces a collimated plane wave 424 which serves as a reference beam, or passes between the optical stops 416 and 418 and the negative lens 414. The light rays 425 and 426 which are not transmitted through the negative lens 414, and do not, thereby, become a part the reference beam 424, continue unperturbed and diverge until being reflected by wall 406 and 404, respectively, of optical chamber 402. Divergent light rays 425 and 426 are reflected from walls 404 and 406 toward a central location in chamber 402. Disposed at a central location in chamber 402 is a holographic recording medium 428. Incident upon recording 428 are reflected rays 427 and 429 and reference beam 424. The dimensions of negative lens 414, the thickness of transparent back surface 408, the dimensions and position of optical stops 416 and 418, together with the separation distance of walls 404 and 406, as well as the positioning of holographic recording medium 428 are variable and are largely a function of the designer's choice and a manipulation of these dimensions will result in a manipulation of the object beam incident upon holographic recording medium 428.

The optical chamber 402 can be of any suitable shape but a rectangular or cylindrical shape is preferred. If a cylindrical shape is used, then optical stops 416 and 41B would be a single washer shaped stop.

In operation, the apparatus of FIG. 4 shows a complete optical set up for producing a holographic optic element collimator of the present invention, the laser provides a source of coherent light while the beam expander causes the light to diverge. A portion of the diverging light is intercepted by the negative lens and converted back into a plane wave, which is utilized as a reference beam. The negative lens is preferably a single large lens which is mounted in the central portion of the glass plate. Some of the diverging light from the beam expander passes around the negative lens and is reflected from the interior of the cylindrical chamber. The holographic recording medium then is able to record the interference pattern created by the interference of the collimated plane waves, or reference beam, with the reflected beams, from the cylindrical chamber, otherwise known as the object beam.

It is thought that the holographic optic element collimator and method and apparatus for manufacture, of the present invention, and many of their attendant advantages will be understood from the foregoing description, and will be apparent that various changes will be made in the form, construction, and arrangements of the parts and steps thereof, without departing from the spirit and scope of the invention or sacrificing all their material advantages, the form herein before described being merely preferred or exemplary embodiments thereof.

What is claimed:

1. A method for manufacturing a holographic optic element collimator comprising the steps of:
    providing a holographic recording medium, having a planar recording surface and a central point thereon;
    providing a collimated reference beam which is incident upon said planar recording surface and said central point of said holographic recording medium at normal incidence;
    interfering an object beam having annular symmetry about a line normal to said central point with said reference beam.

2. A method of claim 1 wherein said interfering an object beam further comprises:
    providing a point source of light;
    providing a mirror for reflecting light from said point source of light toward said holographic recording medium; and
    rotating said mirror around a line normal to said central point, so that, an object beam having annular symmetry around said normal to central point is provided.

3. A method of claim 1 wherein said interfering an object beam further comprises:
    providing a plurality of object beams positioned about a line normal to said central point with said reference beam.

4. An apparatus comprising:
    an optical chamber having a front end, a back end and a lateral wall extending between said front end and said back end;
    said lateral wall having a reflective surface thereon for reflecting laser light;
    said front end having a light transmissive characteristic for permitting the transmission of laser light therethrough;
    an optical stop having a light transmissive characteristic which is relatively less transmissive as compared with said light transmissive characteristic of said front end;
    a lens disposed on said front end for collimating light from a diverging light source;
    a laser for emitting coherent light toward said front end of said optical chamber;
    a beam expander disposed between said laser and said front end of said optical chamber for providing a divergent light source from said laser; and,
    a holographic recording medium disposed within said optical chamber between said front end and said back end.

5. An apparatus comprising:
    a holographic recording medium;
    a laser beam for producing a collimated reference beam incident upon said holographic recording medium;
    a point light source for emitting a divergent light beam;
    a reflecting surface disposed between said point light source and said holographic recording medium, so that light from said point light source is reflected off said reflecting surface toward said holographic recording medium; and, means for manipulating said reflecting surface, so that, said light from said point light source is reflected from said reflecting surface at variable positions which allows for variable angles of incidence of said reflected light upon said holographic recording medium.

6. A holographic optical element collimator which comprises:

a planar holographic recording medium having an interference pattern recorded therein; and, said interference pattern being formed by interfering a collimated reference beam, incident upon said recording medium, with an object beam having annular symmetry about a line normal to said planar holographic recording medium.

* * * * *